(12) United States Patent
Barney

(10) Patent No.: US 6,289,341 B1
(45) Date of Patent: Sep. 11, 2001

(54) INTELLIGENT AGENT FOR IDENTIFYING INTELLECTUAL PROPERTY INFRINGEMENT ISSUES IN COMPUTER NETWORK SITES AND METHOD OF OPERATION THEREOF

(75) Inventor: Matthew F. Barney, Bowling Green, OH (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/105,607

(22) Filed: Jun. 26, 1998

(51) Int. Cl.$^7$ .................................................. G06F 17/30
(52) U.S. Cl. ............................................. 707/6; 707/10
(58) Field of Search .............................. 707/4, 5, 6, 104, 707/10; 382/209, 215; 345/326

(56) References Cited

U.S. PATENT DOCUMENTS

| | | | |
|---|---|---|---|
| 5,761,662 * | 6/1998 | Dasan ...................................... | 707/10 |
| 5,862,260 * | 1/1999 | Rhoads ................................. | 382/232 |
| 6,029,167 * | 2/2000 | Evans ....................................... | 707/4 |
| 6,029,195 * | 2/2000 | Herz ...................................... | 709/219 |
| 6,037,935 * | 3/2000 | Bates et al. ........................... | 345/335 |
| 6,038,561 * | 3/2000 | Snyder et al. ........................... | 707/6 |
| 6,067,539 * | 5/2000 | Cohen ...................................... | 707/2 |

\* cited by examiner

*Primary Examiner*—Thomas Black
*Assistant Examiner*—John C. Loomis

(57) ABSTRACT

An intelligent agent capable of traversing sites in a computer network to identify intellectual property (IP) infringement issues that may exist in those network sites and a method of identifying such IP infringement issues. In one embodiment, the agent includes: (1) a site database containing sites to be traversed, (2) an IP database containing IP indicia to be compared and (3) a site examiner, associated with the site and IP databases, that traverses the sites identified in the site database, compares data associated with the sites with the IP indicia in the IP database and creates a record of favorable comparisons between the data and the IP indicia.

17 Claims, 2 Drawing Sheets

INTELLIGENT AGENT FOR IDENTIFYING INTELLECTUAL PROPERTY INFRINGEMENT ISSUES IN COMPUTER NETWORK SITES AND METHOD OF OPERATION THEREOF

TECHNICAL FIELD OF THE INVENTION

The present invention is directed, in general, to a search agent, and, more specifically, to an intelligent agent capable of traversing sites in a computer network to identify intellectual property infringement issues that may exist in those network sites and a method of identifying such intellectual property infringement issues.

BACKGROUND OF THE INVENTION

The Internet has enabled the ubiquitous, effortless, and cost-free sharing of all types of information including graphics, text, and multimedia. The popularity of the Internet is due, in part, to the ease with which information, stored in digital form, may be disseminated to a mass audience. Information available on the Internet, however, may be protected by trademarks, copyrights, licenses, or patents. Since the information may be easily copied, some individuals or organizations may wish to appropriate the information for their own uses, in violation of applicable intellectual property laws. As organizations shift more resources toward the Internet, illegal use of such proprietary information is likely to worsen.

Organizations have an interest in identifying patent infringements and unapproved or inappropriate uses of copyrights, licenses and trademarks. A corporation, for example, may desire to restrict its software to only licensed users. The corporation must, therefore, monitor the Internet for unauthorized distribution sites. With the rapidly increasing number of Internet sites, however, it is extremely difficult to monitor all of the Internet sites for all potential violations.

The conventional approach to detecting intellectual property violations requires a user to search the Internet, using a manual search engine such as Yahoo®, Hotbot®, or Infoseek®. The user simply enters one or more key words and the selected search engine returns a list of sites containing the key word(s). Alternatively, the user may conduct boolean searches where certain terms are excluded and other terms are included. The use of these search engines is extremely time consuming, since the user must then manually search through the many (sometimes thousands of) sites that contain the key word(s) to locate possible intellectual property violations.

Accordingly, what is needed in the art is a device and method that automatically identifies potential intellectual property infringement in computer networks such as the Internet, thereby reducing the number of sites through which the user must search.

SUMMARY OF THE INVENTION

To address the above-discussed deficiencies of the prior art, the present invention provides an intelligent agent capable of traversing sites in a computer network to identify intellectual property (IP) infringement issues that may exist in those network sites and a method of identifying such IP infringement issues. In one embodiment, the agent includes: (1) a site database containing sites to be traversed, (2) an IP database containing IP indicia to be compared and (3) a site examiner, associated with the site and IP databases, that traverses the sites identified in the site database, compares data associated with the sites with the IP indicia in the IP database and creates a record of favorable comparisons between the data and the IP indicia.

The present invention therefore introduces the broad concept of an agent that is directed to specific sites in a computer network, such as the Internet, and that compares data at those sites with certain IP indicia to determine whether the data are similar. Similarity indicates the presence of a potential infringement issue that should subsequently be manually investigated. The present invention may thus assist brand/image managers and attorneys in protecting the organization's IP rights by improving their ability to scan the Internet to discover indiscretions, while reducing the cognitive load of searching through thousands of sites manually.

In one embodiment of the present invention, the sites are selected from the group consisting of: (1) World Wide Web sites, (2) Internet Relay Chat (IRC) channels, (3) Usenet newsgroups, (4) Wide Area Information Systems (WAIS), (5) Gopher servers and (6) File Transfer Protocol (FTP) servers. Therefore, "sites" is broadly defined to be any location in a computer network, whether the location is a single computer, within a single computer, a subnetwork or within a subnetwork. The sites denoted above are familiar to those who use the Internet. Those skilled in the art will readily perceive, however, that the present invention is neither limited to use in conjunction with the Internet nor with certain types of sites.

In one embodiment of the present invention, the site database contains an examination depth indicator associated with each of the sites, the site examiner traversing the sites identified in the site database to an extent based on the examination depth indicator. The examination depth indicator may, in the case of a World Wide Web site, limit examination to a main page (e.g., when it defects the robot exclusion protocol) or to a defined level or set of subordinate pages, or may designate the entire site as subject to examination. To the extent that the agent can breach firewalls, data behind those firewalls are also subject to examination based on the examination depth indicator.

In one embodiment of the present invention, the IP indicia are selected from the group consisting of: (1) patent keywords, (2) filenames, (3) wordmarks, (4) logo images and (5) copyrighted textual passages. In a way to be illustrated and described, patent, trademark, trade secret and copyright infringements are determined differently. The present invention accordingly allows different types of IP indicia to be stored in the IP database to increase the likelihood that favorable comparisons are made and found to be correct.

In one embodiment of the present invention, the site database contains geographic site demarcations. In other words, a user may designate all sites within one or more geographic regions (such as China or Russia) to be searched, rather than individual sites. The present invention also accommodates other group-based demarcations (such as top-level domain name).

In one embodiment of the present invention, the favorable comparisons are based on correlations between the data and the IP indicia. Favorable comparisons may therefore not only result from exact duplication, but also from degrees of similarity, typically measured mathematically by the well-known technique of correlation. This may result in a "fuzzy" comparison, which can be advantageous in uncovering certain types of IP infringement. Of course, the present invention is not limited to any one mathematical or logical comparison technique.

In one embodiment of the present invention, the agent further includes a favorable comparison database that contains the record and other records that the site examiner creates during traversal of the sites. Thus, in one advantageous embodiment, the agent is "launched" into the computer network and "returns" later with a comprehensive list of suspected infringements. Alternatively, the agent can "return" with one infringement issue at a time, relieving the need for a database.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

The present invention is easily distinguished from prior art search engines. A Lycos® search engine, for example, uses both a heuristic approach and a web site "popularity" approach to determine which sites to examine. While site popularity may be useful for identifying especially widespread violations of IP, it is not required by the present invention.

Another search engine is disclosed in U.S. Pat. No. 5,659,732, assigned to Infoseek Corporation and entitled "Document Retrieval over Networks Wherein Ranking and Relevance Scores Are Computed at the Client for Multiple Database Document." The Infoseek system arranges search results in a hierarchy, listing best matches first. The user, however, is still required to manually search through the potentially large number of sites.

U.S. Pat. No. 5,379,420, assigned to TRW and entitled "High-speed Data Searching Apparatus and Method Capable of Operation in Retrospective and Dissemination Modes" describes a general database search engine. Unlike the present invention, however, the TRW invention lacks several features that particularly tailor the present invention towards automatic discovery of IP violations.

Figure 1:
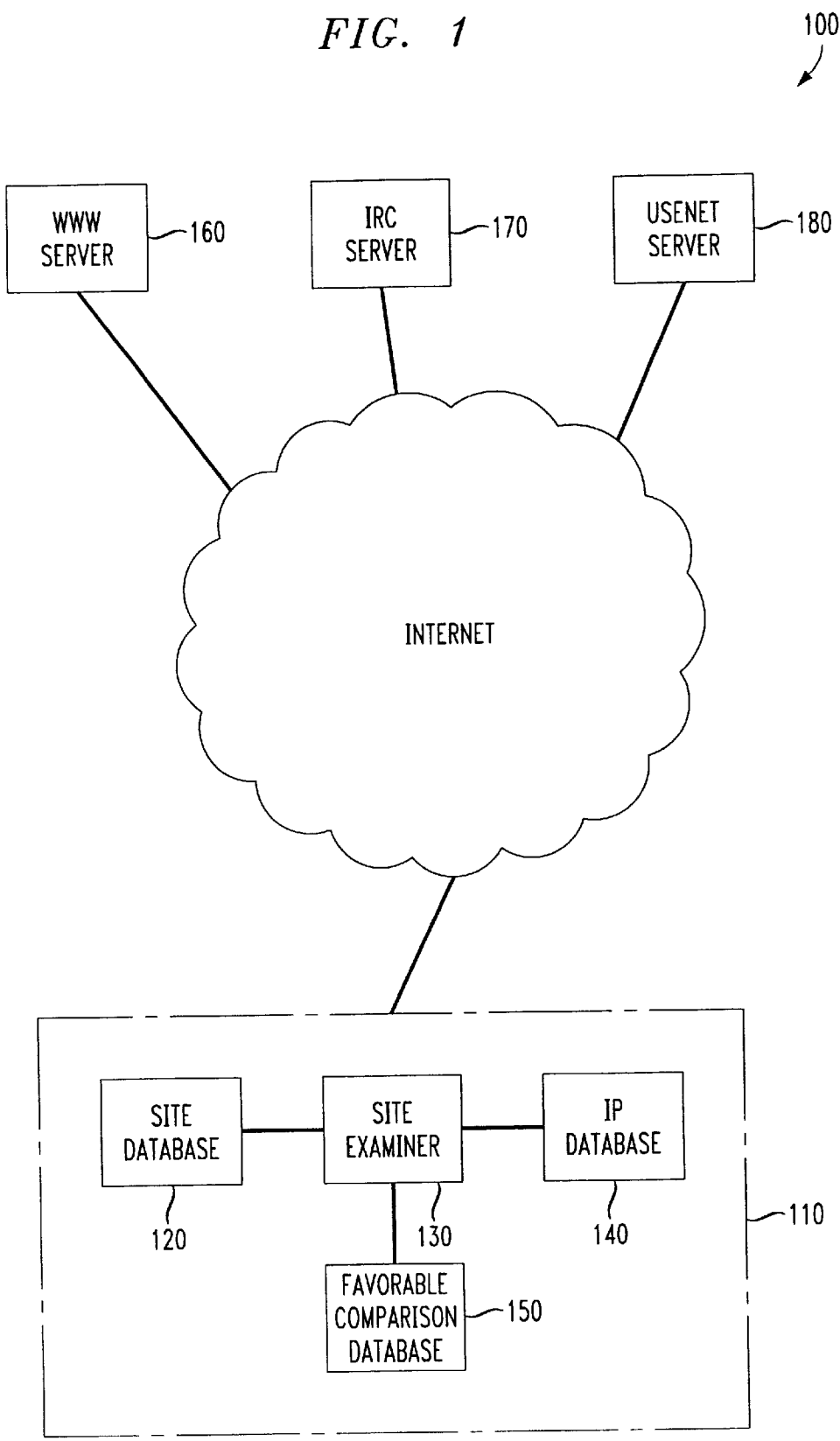
FIG. 1 illustrates a block diagram of a computer network containing an intelligent agent constructed in accordance with the principles of the present invention.

Referring initially to FIG. 1, illustrated is a block schematic of a computer network 100 containing an intelligent agent 110 constructed in accordance with the principles of the present invention. In the illustrated embodiment, the computer network 100 is the Internet and includes a World Wide Web server 160 that hosts World Wide Web sites, an Internet Relay Chat (IRC) server 170 having an IRC channel, and a Usenet server 180 hosting a Usenet newsgroup. Those skilled in the art are familiar with the Internet and other types of sites or servers (e.g., Wide Area Information Systems, Gopher servers, and File Transfer Protocol servers) located therein. Of course, the present invention is neither limited to use in conjunction with the Internet nor with certain types of sites.

The intelligent agent 110, which is a sequence of instructions executable in the environment of a personal computer in the illustrated embodiment, includes a site database 120 containing sites to be traversed. In the illustrated embodiment, the site database 120 contains Uniform Resource Locators (URLs) or Internet Protocol addresses of the sites. Of course, the site database 120 may also contain other ways of designating the sites to be traversed. The intelligent agent 110 further includes an IP database 140 containing IP indicia to be compared. The intelligent agent 110 further includes a site examiner 130, associated with the site and IP databases 120, 140. The site examiner 130 traverses the sites identified in the site database 120 and compares data associated with the sites with the IP indicia in the IP database 140. The intelligent agent 110 still further includes a favorable comparison database 150 wherein the intelligent agent 110 stores records of favorable comparisons identified during its traversal of the sites. While the favorable comparison database 150 allows the intelligent agent 110 to store a list of potentially infringing sites identified by the site examiner, those skilled in the art will realize that the favorable comparison database 150 is not required by the invention.

In a preferred embodiment, the site database 120 also contains an examination depth indicator associated with each site. The site examiner 130, therefore, traverses the sites identified in the site database 120 to an extent based on the examination depth indicator. The examination depth indicator may, for instance, limit examination of a web site to a main page or to a defined level of subordinate pages. Alternatively, the examination depth indicator may designate that the entire web site be examined for potential IP violations. By controlling the examination depth, a user may significantly reduce the time required to traverse sites having a low probability of IP violations. Sites having a higher probability of IP violations may, of course, be examined in their entirety. Those skilled in the art will realize, however, that the examination depth indicator is not necessary to the present invention.

The intelligent agent 110 operates as follows. Site designations and IP indicia are loaded into the site and IP databases, 120, 140, respectively. The site designations may include individual sites (e.g., those of known pirates, suspected pirates, or URLs that have been used to access a particular domain), sites located within a particular geographic region (e.g., Russia is a hotbed of software piracy), or sites having certain top-level domain names. Additionally, specific Usenet newsgroups of concern (e.g., "warez" groups) or IRC sessions that are likely to contain IP violations may be selected. The site designations may be selected by the user, or, alternatively, the site designations may be a database of URLs generated by conventional search engines.

The IP indicia may include such items as patent keywords, filenames, wordmarks, logo images, and copyright textual passages. To locate patent infringement, for example, the user may enter in the IP database 140 a number of patent keywords likely to be associated with the infringing device. To locate trademark infringement, the user may load a template of the trademark in the IP database 140.

The site examiner 130 then traverses the sites listed in the site database 120, comparing data associated with the sites to the IP indicia in the IP database 140. If the site database 120 contains an examination depth indicator associated with each site, each examination depth indicator limits an extent to which the site examiner 130 searches the associated site. While the examination depth indicator may significantly reduce the time required to traverse sites having a low probability of IP violations, those skilled in the art will realize that the examination depth indicator is not necessary to the present invention.

As the site examiner 130 traverses each site, it compares data associated with the sites and the IP indicia. The site examiner 130 may make direct comparisons between the IP indicia and the data associated with the sites. To locate copyright infringement, for example, the site examiner 130 may be set to search for an exact copyrighted textual passage.

The site examiner 130 may also use neural networks or statistics to make the comparisons. The site examiner 130 may, for instance, search for correlations by using conventional mathematical techniques. The user may cluster similar words into groups, searching the site for any word within the group. Favorable comparisons (e.g., high pearson r correlation coefficients) are then recorded in the favorable comparison database 150. If the user then provides feedback to the intelligent agent 110 as to which records contain instances of actual infringement using neural networks (learning algorithms), the intelligent agent 100 may be able to optimize its search ability over time (e.g., by ignoring the non-infringing sites in the future). While the ability of the intelligent agent 110 to optimize searches is useful, those skilled in the art will realize that it is not necessary to the practice of the present invention.

In a preferred embodiment of the present invention, the site examiner 130 is capable of performing image searches. The site examiner 130 may thus seek out image file formats (e.g., .jpg, .gif, .bmp, .tga) and compare the files with trademarks, copyrighted images or images related to patents (e.g., schematics). To perform an image search, the user may provide the site database 120 with a template against which the agent can compare other images. The template may be a large, high-resolution image that may be reduced and transformed for comparison purposes, without significant loss in image quality. The site examiner 130 may then use conventional pattern recognition algorithms to compare the two images and identify likely matches.

Once the site examiner 130 finds an exact match or a correlation, the site examiner 130 may store a record of the favorable comparisons in the favorable comparison database 150. The records may then be reported to the user once the site examiner 130 has concluded its traversal of the sites. Alternatively, the site examiner 130 may report to the user as it finds favorable comparisons, relieving the need for the favorable comparison database 150.

Figure 2:
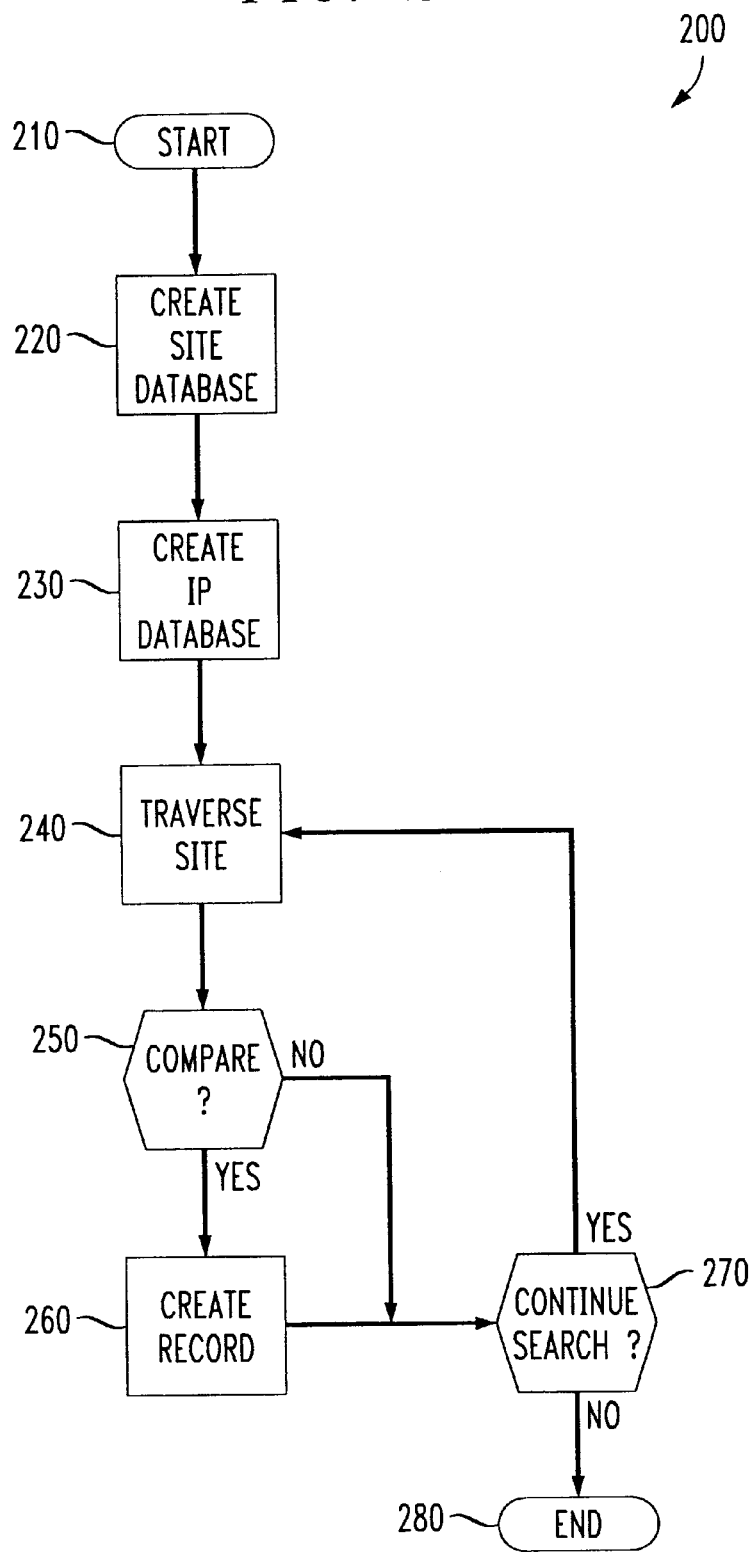
FIG. 2 illustrates an embodiment of a method for identifying intellectual property infringement issues constructed in accordance with the principles of the present invention.

Turning now to FIG. 2, illustrated is an embodiment of a method for identifying intellectual property infringement issues, generally designated 200, constructed in accordance with the principles of the present invention. The method begins at a start step 210. Next, at a create site database step 220, site designations (e.g., URLs, Internet Protocol addresses) of potential infringers are organized into a site database. Then, at a create IP database step 230, IP indicia, such as key search terms, are entered into the IP database. Those skilled in the art will realize that the create IP database step 230 may be performed prior to the create site database step 220, or, alternatively, the create site database step 220 and the create IP database step 230 may be performed concurrently.

In a preferred embodiment, the create IP database step 230 operates as follows. A user (such as an inventor wishing to protect her patent) may use a WWW browser to and surf to a site containing the intelligent agent. The site then offers the user the option of either creating a list of key search terms (related to the intellectual property) on line, or e-mailing a database file (containing the search terms) to the intelligent agent. The user may then set a sensitivity of the intelligent agent by, for example, specifying the total number of word matches or minimum correlation coefficients that are required in order for the intelligent agent to report a violation. Alternatively, the user may increase the intelligent agent's sophistication in identifying IP violations by clustering words that have a similar or identical meaning into groups such that if any word within a group is present at a particular site, the intelligent agent will identify the site as a potential infringer and record a favorable comparison.

Next, at a traverse site step 240, the intelligent agent traverses a site identified in the site database. Then, at a compare step 250, the intelligent agent compares data associated with the site with the IP indicia to determine whether the site contains a favorable comparison. If so, the intelligent agent continues to a create record step 260, recording the URL of the site in a favorable comparison database. In one embodiment, the intelligent agent may notify the user as favorable comparisons are found by e-mail or by updating a World Wide Web page accessible by the user. Of course, such notification is not necessary to the present invention. Then, at a continue search step 270, the intelligent agent determines whether it has traversed all the sites identified in the site database. If all the sites have not been traversed, the method 200 returns to the traverse site step 240. If all the sites have been traversed, the method 200 ends at an end step 280.

Alternatively, if the intelligent agent does not find a favorable comparison at the compare step 250, it proceeds to the continue search step 270. The intelligent agent may then continue the search by returning to the traverse site step 240 if all the sites in the site database have not been traversed. Otherwise, the method ends at the end step 280. The traverse site step 240, compare step 250, and create record step 260 may thus be repeated until the intelligent agent has traversed all the sites in the site database.

Although the present invention has been described in detail, those skilled in the art should understand that they can make various changes, substitutions and alterations herein without departing from the spirit and scope of the invention in its broadest form.

What is claimed is:

1. A method of identifying intellectual property (IP) infringement issues associated with sites of a computer network, comprising:

creating a site database containing sites to be traversed;

creating an IP database containing IP indicia to be compared, said IP indicia being selected from the group consisting of patent keywords, filenames, wordmarks, watermark-free logo images, and copyrighted textual passages;

traversing said sites identified in said site database;

comparing data associated with said sites with said IP indicia in said IP database; and creating a record of favorable comparisons between said data and said IP indicia.

2. The method as recited in claim 1 wherein said sites are selected from the group consisting of:
World Wide Web sites,
Internet Relay Chat (IRC) channels,
Usenet newsgroups,
Wide Area Information Systems (WAIS),
Gopher servers, and
File Transfer Protocol (FTP) servers.

3. The method as recited in claim 1 wherein said site database contains an examination depth indicator associated with each of said sites, said step of traversing comprising the step of traversing said sites identified in said site database to an extent based on said examination depth indicator.

4. The method as recited in claim 1 wherein said site database contains geographic site demarcations.

5. The method as recited in claim 1 wherein said step of comparing comprises the step of correlating said data and said IP indicia.

6. The method as recited in claim 1 further comprising the step of creating a favorable comparison database that contains said record and other records created during traversal of said sites.

7. For use in traversing sites of a computer network to identify intellectual property (IP) infringement issues associated therewith, an agent, comprising:
a site database containing sites to be traversed;
an IP database containing IP indicia to be compared, said IP indicia being selected from the group consisting of patent keywords, filenames, wordmarks, watermark-free logo images, and copyrighted textual passages; and
a site examiner, associated with said site and IP databases, that traverses said sites identified in said site database, compares data associated with said sites with said IP indicia in said IP database and creates a record of favorable comparisons between said data and said IP indicia.

8. The agent as recited in claim 1 wherein said sites are selected from the group consisting of:
World Wide Web sites,
Internet Relay Chat (IRC) channels,
Usenet newsgroups,
Wide Area Information Systems (WAIS),
Gopher servers, and
File Transfer Protocol (FTP) servers.

9. The agent as recited in claim 1 wherein said site database contains an examination depth indicator associated with each of said sites, said site examiner traversing said sites identified in said site database to an extent based on said examination depth indicator.

10. The agent as recited in claim 1 wherein said site database contains geographic site demarcations.

11. The agent as recited in claim 1 wherein said favorable comparisons are based on correlations between said data and said IP indicia.

12. The agent as recited in claim 1 further comprising a favorable comparison database that contains said record and other records that said site examiner creates during traversal of said sites.

13. For use in traversing Internet sites to identify intellectual property (IP) infringement issues associated therewith, an agent, comprising:
a site database containing sites to be traversed and an examination depth indicator associated with each of said sites;
an IP database containing IP indicia to be compared, said IP indicia being selected from the group consisting of patent keywords, filenames, wordmarks, watermark-free logo images, and copyrighted textual passages;
a site examiner, associated with said site and IP databases, that traverses said sites identified in said site database to an extent based on said examination depth indicator and compares data associated with said sites with said IP indicia in said IP database; and
a favorable comparison database that contains records of favorable comparisons that said site examiner creates during traversal of said sites.

14. The agent as recited in claim 13 wherein said sites are selected from the group consisting of:
World Wide Web sites,
Internet Relay Chat (IRC) channels,
Usenet newsgroups,
Wide Area Information Systems (WAIS),
Gopher servers, and
File Transfer Protocol (FTP) servers.

15. The agent as recited in claim 13 wherein said site database contains geographic site demarcations.

16. The agent as recited in claim 13 wherein said favorable comparisons are based on correlations between said data and said IP indicia.

17. The agent as recited in claim 13 wherein said sites are obtained from a Uniform Resource Locator (URL) database associated with a search engine.

\* \* \* \* \*